US006351995B1

United States Patent
Yamashita

(12) United States Patent
(10) Patent No.: US 6,351,995 B1
(45) Date of Patent: Mar. 5, 2002

(54) ACCELERATION SENSOR

(75) Inventor: Muneharu Yamashita, Toyama-ken (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/441,690

(22) Filed: Nov. 16, 1999

(30) Foreign Application Priority Data

Nov. 25, 1998 (JP) .............................. 10-333520

(51) Int. Cl.[7] .............................................. G01P 15/09

(52) U.S. Cl. ...................... 73/514.34; 73/493; 310/319

(58) Field of Search ........................ 73/514.34, 514.16, 73/514.01, 493, 1.38; 310/319, 329, 331

(56) References Cited

U.S. PATENT DOCUMENTS 4,658,650 A * 4/1987 Yorinaga et al. .............. 73/654
5,942,685 A * 8/1999 Tabota ..................... 73/514.34

* cited by examiner

*Primary Examiner*—John E. Chapman
(74) *Attorney, Agent, or Firm*—Ostrolenk, Faber, Gerb & Soffen, LLP

(57) ABSTRACT

A high-precision acceleration sensor capable of performing sensitivity adjustment by the sensor alone includes an acceleration sensing device disposed in an insulated case, in which external lead electrodes connected to the acceleration sensing device, a trimmable resistor, and external lead electrodes connected to both ends of the trimmable resistor, are formed on a surface of the insulating case. The trimmable resistor is a film-formed resistor made by printing. The sensitivity of the acceleration sensor can be adjusted by laser-trimming of the trimmable resistor.

18 Claims, 5 Drawing Sheets

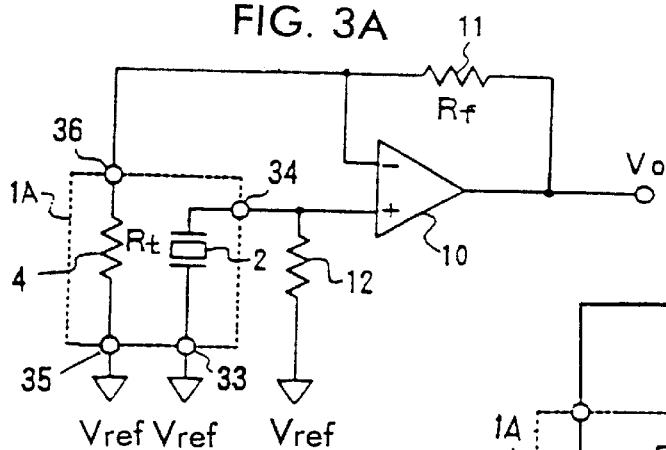
FIG. 3A
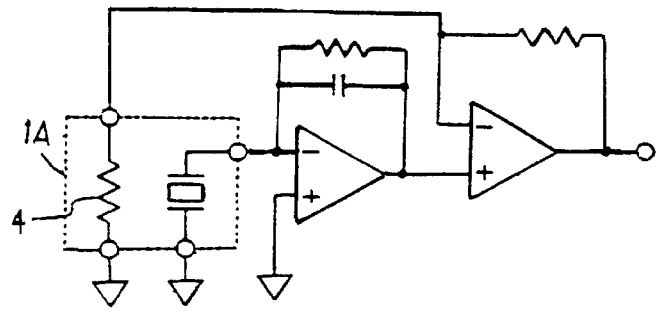
FIG. 3B
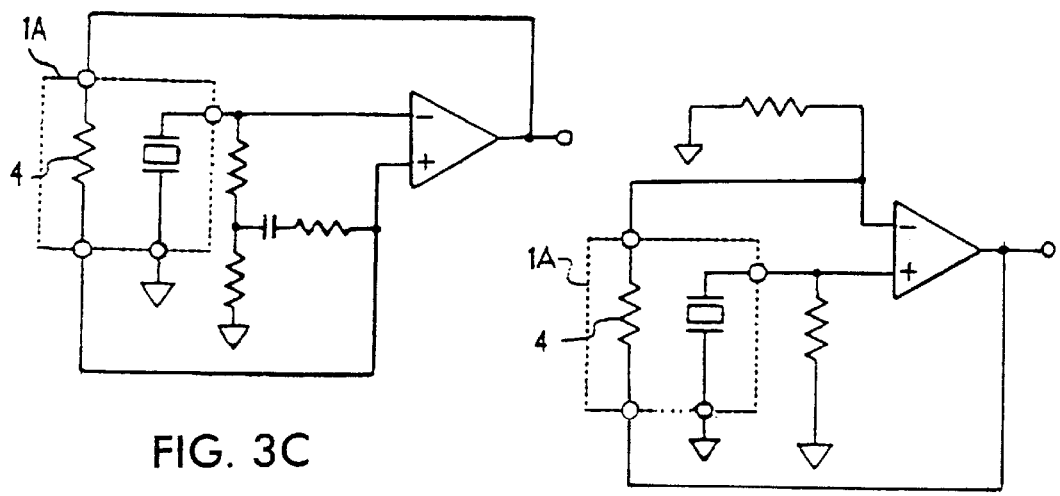
FIG. 3C
FIG. 3D
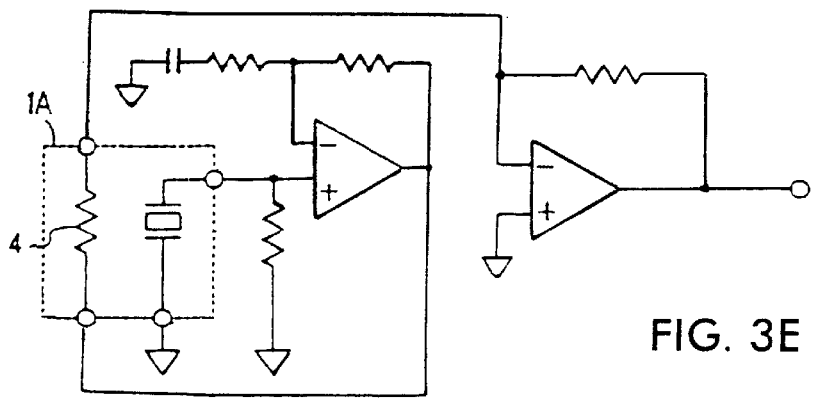
FIG. 3E

ACCELERATION SENSOR

BACKGROUND OF THE INVENTION

1. Field of the Invention

The present invention relates to an acceleration sensor capable of performing sensitivity adjustment.

2. Description of the Related Art

Conventionally, as an acceleration sensor using piezoelectric ceramics, for example, the sensor described in Japanese Patent No. 2780594 has been known. Since such a sensor does not have an adjustment method for adjusting an individual sensor to a targeted sensitivity (voltage output in the case of applying a specified acceleration) or has difficulty in adjusting an individual one to a targeted sensitivity, it has a sensitivity tolerance between approximately ±5 and ±15% due to variations in manufacturing and materials.

Meanwhile, a sensor with high precision, which has a sensitivity tolerance less than ±5%, such as an acceleration sensor used for servo control of a MR-head for Hard Disc Drive, is sometimes required. In order to meet such a demand, it is an ordinary procedure that a gain of an amplifier connected to the subsequent stage of the sensor is adjusted. As a result, in the conventional art, the only way to adjust the sensitivity of a sensor is to connect the sensor to the amplifier and change a resistance value of a gain adjustment resistor.

SUMMARY OF THE INVENTION

Accordingly, it is an object of the present invention to provide an acceleration sensor with high precision, which can perform sensitivity adjustment by the sensor alone.

In order to achieve the above object, the present invention provides an acceleration sensor comprising: an acceleration sensing device; an insulating case including the acceleration sensing device; and at least one sensitivity adjustment trimmable resistor provided on a surface of the insulating case and connected to the acceleration sensing device.

In accordance with one aspect of the present invention, two external lead electrodes are connected to the acceleration sensing device, and another external lead electrode, which is different from the external electrodes connected to the acceleration sensing device, is connected to one end of the trimmable resistor, all of the external leads being provided on the surface of the insulating case.

The trimmable resistor is disposed on a surface of the insulating case of the acceleration sensor and at least one end of the trimmable resistor is extended outside through the external lead electrode which is different from the external lead electrodes of the acceleration sensing device. The other end of the trimmable resistor may also be extended outside through the external lead electrode, which is different from the external lead electrodes of the acceleration sensing device.

The resistance value of the trimmable resistor is adjusted by laser trimming or the like so as to freely adjust the sensitivity of the acceleration sensor and to allow variations in the sensitivity to be held within a range of a targeted tolerance. Since the trimmable resistor is integrally disposed in the acceleration sensor, sensitivity adjustment can be performed by the sensor alone so that a high-precision acceleration sensor can be obtained.

According to another aspect of the present invention, when the other end of the trimmable resistor is connected to an external lead electrode of the acceleration sensor in common, the number of the external lead electrodes formed on the insulated case can be reduced; thereby cost reduction can be achieved.

The trimmable resistor may be, for example, a discrete component mounted by soldering or other ways on the insulating case of the acceleration sensor. However, as another aspect of the present invention it is preferable that a film-formed resistor which is directly and integrally mounted on the insulated case by printing method or the like is used. In this case, modifications in the shape of the package of the acceleration sensor are not necessary, and miniaturization can be achieved.

According to another aspect of the present invention, two sensitivity adjustment trimmable resistors are disposed on the surface of the insulating case; both ends of the first trimmable resistor are connected respectively to external lead electrodes formed on the insulating case which are different from the external lead electrodes of the acceleration sensing device; and the second trimmable resistor is connected between one of the external lead electrodes of the acceleration sensing device and one of the external lead electrodes connected to the first trimmable resistor. For example, when an amplifier is connected to the subsequent stage of the acceleration sensor, the first trimmable resistor formed on the insulating case of the acceleration sensor can be used as a feedback resistor of the amplifier, so that a gain of the amplifier can be freely adjusted.

Although, a sensor using a semiconductor as an acceleration sensor may be used, as another aspect of the present invention, it is preferable that a piezoelectric acceleration sensor, in which a piezoelectric ceramic device converts an acceleration into electrical signals is used. In this case, the insulating case can be formed of an insulating material such as a ceramic.

Other features and advantages of the present invention will become apparent from the following description of the invention which refers to the accompanying drawings.

BRIEF DESCRIPTION OF THE DRAWING(S)

FIGS. 3A–3E show circuit diagrams of some examples of an acceleration sensing device using the acceleration sensor shown in FIG. 1.

DETAILED DESCRIPTION OF EMBODIMENTS OF THE INVENTION

Figure 1:
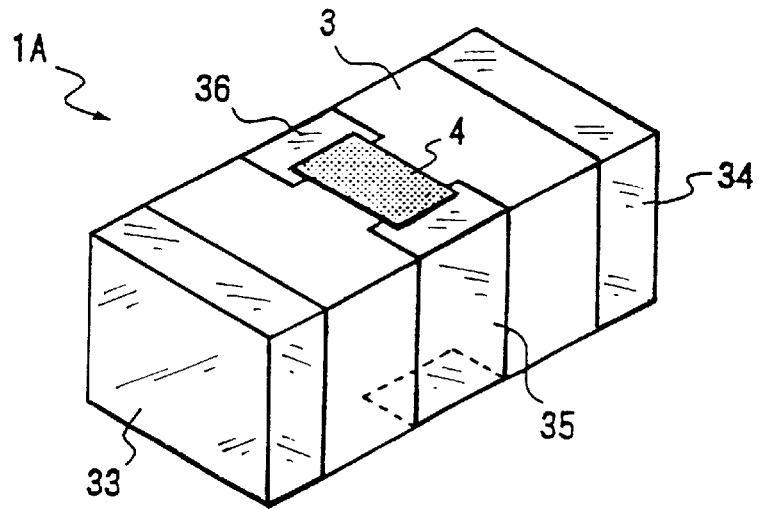
FIG. 1 is a perspective view of a first embodiment of an acceleration sensor according to the present invention.
Figure 2:
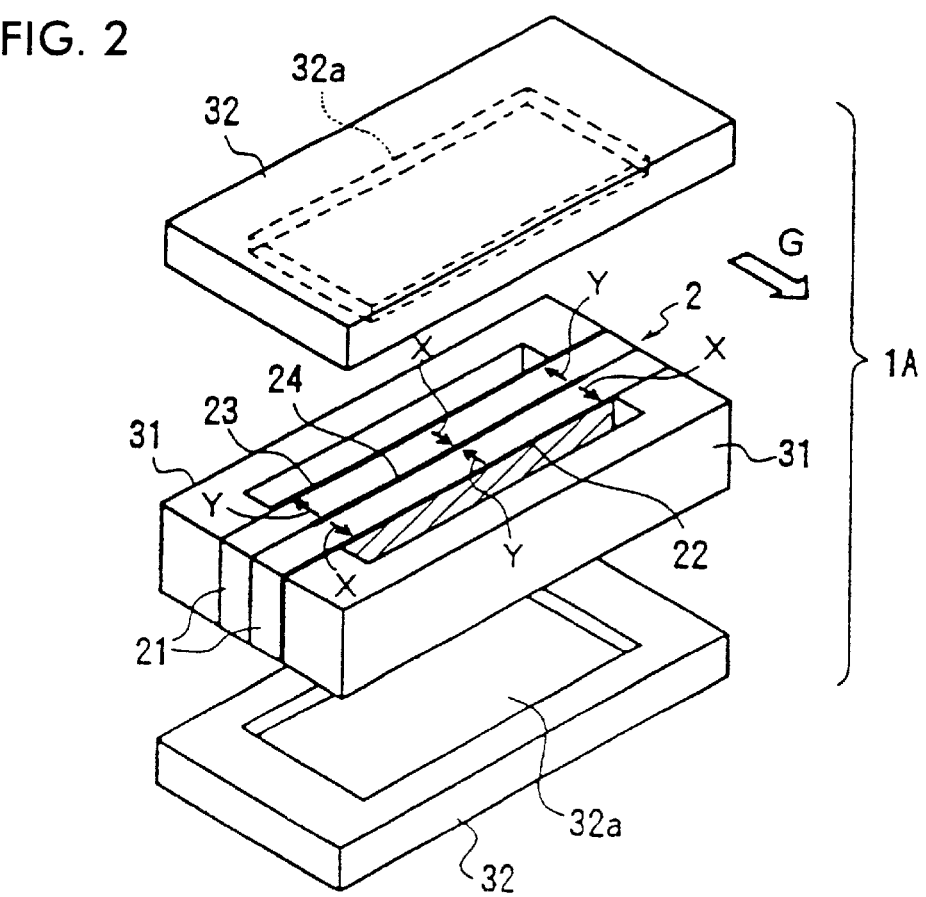
FIG. 2 is an exploded perspective view of the acceleration sensor shown in FIG. 1.

FIGS. 1 and 2 show a first embodiment of an acceleration sensor according to the present invention. This acceleration sensor 1A is constituted as a chip type by disposing an acceleration sensing device 2 in an insulating case 3 formed of, for example, an insulating ceramic or the like. The acceleration sensing device 2 used in this embodiment is a bimorph-type sensing device comprising a pair of strip-shaped piezoelectric ceramic plates 21 having respectively a signal extraction electrode 22 or 23, and an intermediate electrode 24 on their main surfaces, whereby the piezoelectric ceramic plates 21 are integrated in one piece by attaching the intermediate electrodes 24 mutually opposed together. Each of the piezoelectric ceramic plates 21 is divided into three regions along the longitudinal direction, in which the center part and the edge parts are respectively polarized in an opposite direction to each other (shown by arrows X and Y in FIG. 2) with respect to the thickness direction of the plates.

Both ends of the sensing device 2 in the longitudinal direction are fixed to a support by a pair of ceramic supporting frames 31, which is in a U-shaped form in profile, and the open surfaces formed by the sensing device 2 and the supporting frames 31 are covered by a pair of ceramic cover plates 32. A recess 32 a for preventing the cover plates 32 from contacting with the sensing device 2 is formed on the inner surface of the cover plates 32. An insulating case 3 is formed by the supporting frame 31 and the covering plates 32. As a material of the insulating case 3, an insulating resin other than an insulating ceramic or the like may be used.

The signal-extraction electrodes 22 and 23 formed on the respective piezoelectric ceramic plates 21 are respectively connected to external lead electrodes 33 and 34 formed on both end faces of the supporting frame 31 and the cover plates 32. When an acceleration G acts in the direction of the arrow, an inertial force acts on the sensing device 2; then the central part of the sensing device 2 deforms in a direction opposite to the direction in which the acceleration G acts; and electrical charge generated in response to the deformation is taken from the signal extraction electrodes 22 and 23 to the external lead electrodes 33 and 34. However, the detailed explanation is omitted herein, since this action is described in Japanese Patent No. 2780594.

At the center portion of the insulating case 3 in the longitudinal direction, a pair of external lead electrodes 35 and 36 are extended from the upper surface through the side surface to the lower surface. On the upper surface of the insulating case 3, that is, on a surface of the upper-side cover 32, a sensitivity adjustment trimmable resistor 4 is made in a thick-film form by the method of printing or the like so as to be connected to the external lead electrodes 35 and 36. As for the trimmable resistor 4, other than a thick-film resistor of ruthenium oxide base, which is used for an ordinary chip resistor, a metal thin-film one may be used. In addition, as for the method of forming the external lead electrodes 35 and 36, for example, a base is made by baking or sputtering of conductive paste and plating is performed on the base so as to form an electrode with high strength. Additionally, other known methods can be used for forming the electrode.

In the case of adjusting the sensitivity of the above acceleration sensor 1A, the circuit to be used is determined, and when the acceleration sensor 1A is mounted on the circuit and a predetermined acceleration G is applied thereto, the trimmable resistor 4 is trimmed so as to obtain a desired target value. Trimming in such a way allows variations in the sensitivity of the acceleration sensor 1A to be extremely small (for example, within ±2%).

FIG. 3A shows an example of an acceleration sensing device using the above acceleration sensor 1A. This sensing device uses voltage sensitivity, in which, in addition to the acceleration sensor 1A, an operational amplifier 10, a feedback resistor 11 for providing feedback of the output of the operational amplifier 10 to the inversion input, and a leak resistor 12 connected to the positive input of the operational amplifier 10 are disposed. One end 34 of the sensing device 2 is connected to the positive input of the operational amplifier 10, and one end 36 of the trimmable resistor 4 is connected to the inversion input of the operational amplifier 10. Additionally, Rf is a resistance value of the feedback resistor 11; Rt is a resistance value of the trimmable resistor 4; Vo is an output voltage of the operational amplifier 10; and $V_{ref}$ is voltage applied in common to the other ends of the sensing device 2, the trimmable resistor 4, and the leak resistor 12.

Now, a description will be provided of a sensitivity adjustment method of the above acceleration sensing device.

When a gain of the operational amplifier 10 is represented by A, the following equation is given:

$$A = \frac{Rf + Rt}{Rt} \quad \text{[Equation 1]}$$

Therefore, when output sensitivity with respect to an acceleration of the acceleration sensor 1A is represented by $S_G$ (V/G), the output Vo of the amplifier 10 with respect to the applied acceleration g (G) is obtained by the equation below:

$$Vo = \frac{Rf + Rt}{Rt} \cdot S_G \cdot g \quad \text{[Equation 2]}$$

Now, adjustment of sensitivity Vo/g of the entire structure of the acceleration sensing device including the operational amplifier 10 to a target value with high precision is conducted. First, an appropriate resistance value Rf of the feedback resistor 11, (for example, 100 kΩ) is determined in advance. In this case, an assumption is made that the sensitivity $S_G$ of the sensor alone is made with the tolerance of 1 mV/G±10% (0.9 to 1.1 mV/G). An initial value of the resistance value Rt of the trimmable resistor 4 is set to 8 kΩ, for example. When a target value of the gain of the entire structure including the operational amplifier 10 is set to 10 mV/G ±1%, consequently the sensitivity of the acceleration sensing device is represented by the equation below:

$$\frac{Vo}{g} = \frac{100k + 8k}{8k} \times (0.9 \sim 1.1) = 12.15 \sim 14.85 \quad \text{[Equation 3]}$$

Then, while a predetermined acceleration is applied, the resistance value Rt of the trimmable resistor 4 is adjusted by a laser trimmer or the like, so as to make the value of Vo/g the target value 10 mV/G. By using such a method for adjusting the sensitivity of the acceleration sensor 1A, an acceleration sensing device which is adjusted with high precision is obtained.

Although FIG. 3A shows an example applying the acceleration sensor 1A shown in FIG. 1, other applicable examples such as FIGS. 3B through 3E are also provided.

FIG. 3B is an example of a circuit using electric charge sensitivity, in which two operational amplifiers are used. FIG. 3C is another example of a circuit using voltage sensitivity, which is a high-impedance type circuit in which a bootstrap is applied. The trimmable resistor 4 forms the feedback resistor of an operational amplifier. FIG. 3D is another example of a circuit using voltage sensitivity, in which the trimmable resistor 4 forms the feedback resistor of an operational amplifier. In FIG. 3E, there are provided two operational amplifiers, in which the trimmable resistor 4 is used as the input resistor of the following-stage inversion amplifier.

Figure 4:
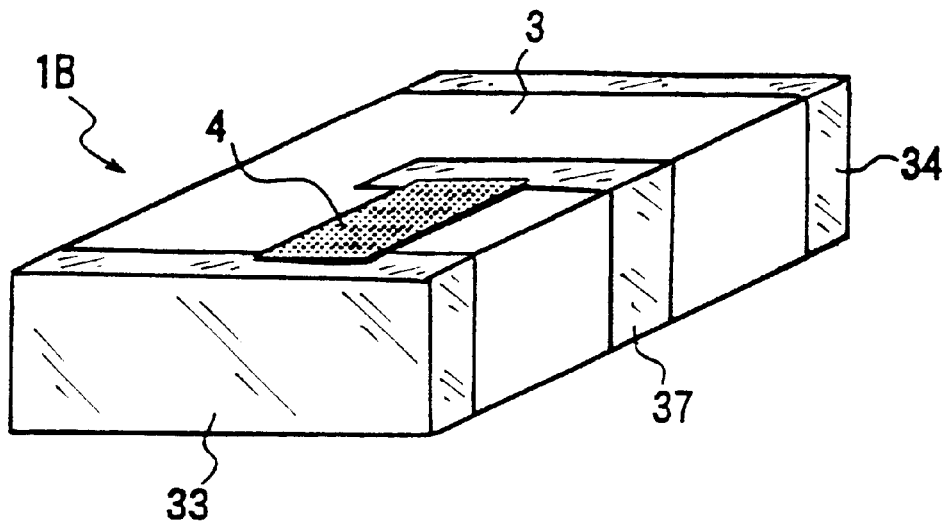
FIG. 4 is a perspective view of a second embodiment of the acceleration sensor.

FIG. 4 shows a second embodiment of an acceleration sensor 1B. In FIG. 1, the trimmable resistor 4 of the acceleration sensor 1A is connected to the two external lead electrodes 35 and 36 formed at the center of the insulating case 3, whereas, in the sensor 1B of FIG. 4, an external lead electrode 37 is formed at the center of the insulating case 3; and the trimmable resistor 4 extends over the external lead electrode 37 and the external lead electrode 33 of the acceleration sensor which is formed at one end of the insulating case 3. That is, the external lead electrode 33 is used as both one terminal of the sensing device 2 and one terminal of the trimmable resistor 4. The trimmable resistor 4, in this case, is also made into a thick-film form by printing or the like.

Figure 5:
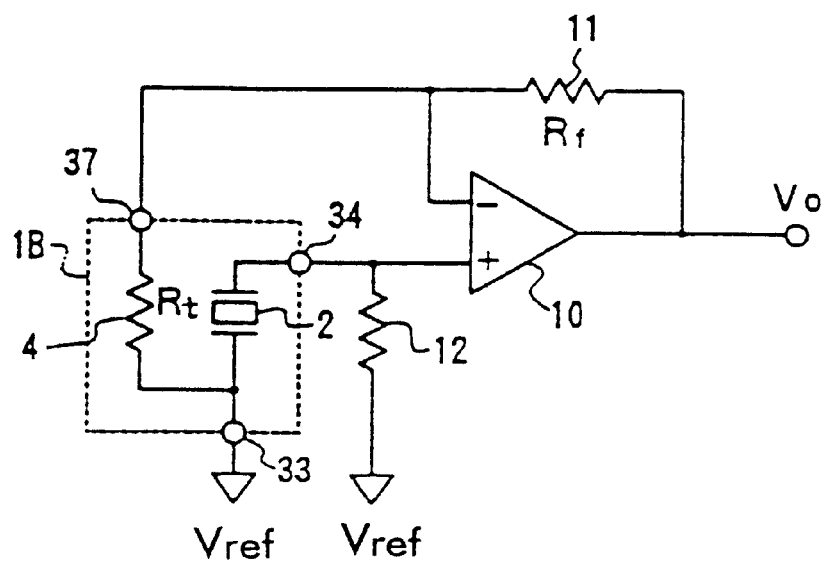
FIG. 5 shows a circuit diagram of an example of an acceleration sensing device using the acceleration sensor shown in FIG. 4.

FIG. 5 shows an example of an acceleration sensing device using an acceleration sensor 1B shown in FIG. 4.

In this case, in the acceleration sensor 1B, one of the external lead electrodes of the trimmable resistor 4 and the external lead electrode 33 of the sensing device 2 are connected in common, so that in the case of connecting to an external circuit by soldering or the like, the number of connecting portions can be reduced to facilitate the connecting process. In addition, formation of electrodes of the acceleration sensor 1B itself can be easily performed.

Since the other parts are the same as that in FIG. 3, the same reference numerals are given to the same parts and an explanation thereof will be omitted.

Figure 6:
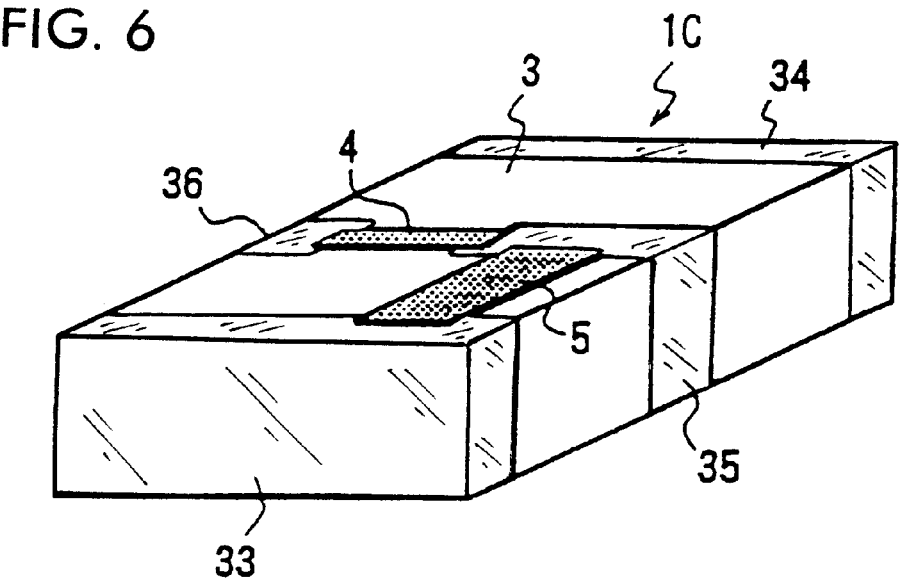
FIG. 6 is a perspective view of a third embodiment of the acceleration sensor.

FIG. 6 shows a third embodiment of an acceleration sensor 1C. In this embodiment, as in the case of FIG. 1, four individual external lead electrodes 33 through 36 are formed on a surface of the insulating case 3 and the resistor 4 is connected between the external lead electrodes 35 and 36. This embodiment differs in that a resistor 5 is connected between the external lead electrodes 35 and 33. One of the resistors 4 and 5 or both can be a trimmable resistor. Since the other structure is the same as that in the first embodiment (shown in FIG. 1 and FIG. 2), the same parts are given the same reference numerals and the explanation will be omitted.

Figure 7:
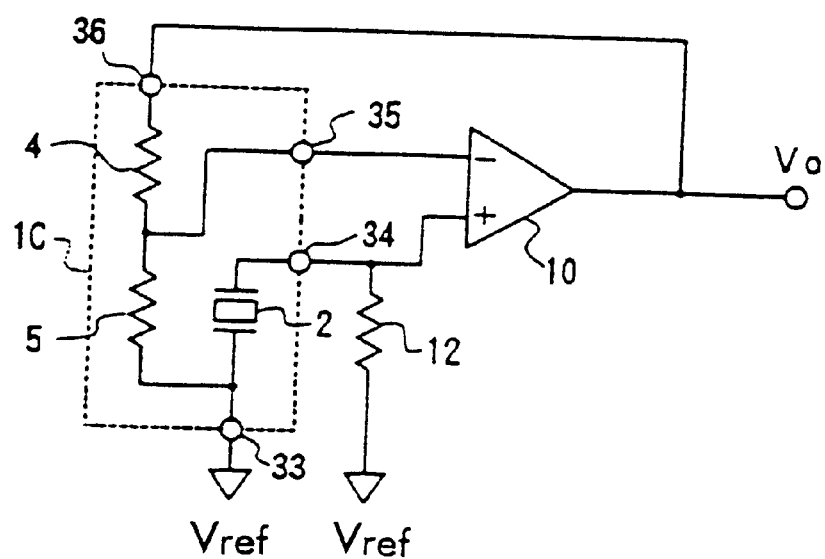
FIG. 7 shows a circuit diagram of an example of an acceleration sensing device using the acceleration sensor shown in FIG. 6.

FIG. 7 shows an example of an acceleration sensing device using the acceleration sensor 1C shown in FIG. 6.

Voltage $V_{ref}$ is applied to the external lead electrode 33 of the acceleration sensor 1C; the external lead electrode 34 is connected to the positive input of the operational amplifier 10; the external lead electrode 35 is connected to the inversion input of the operational amplifier 10; and the external lead electrode 36 is connected to the output of the operational amplifier 10. In this case, since not only the sensitivity adjustment resistor 5 but also the feedback resistor 4 of the operational amplifier 10 are contained in the acceleration sensor 1C, these resistors 4 and 5 are used as trimmable resistors so as to freely perform adjustment of gain of the operational amplifier 10 as well as sensitivity adjustment of the sensor 1C.

Figure 8:
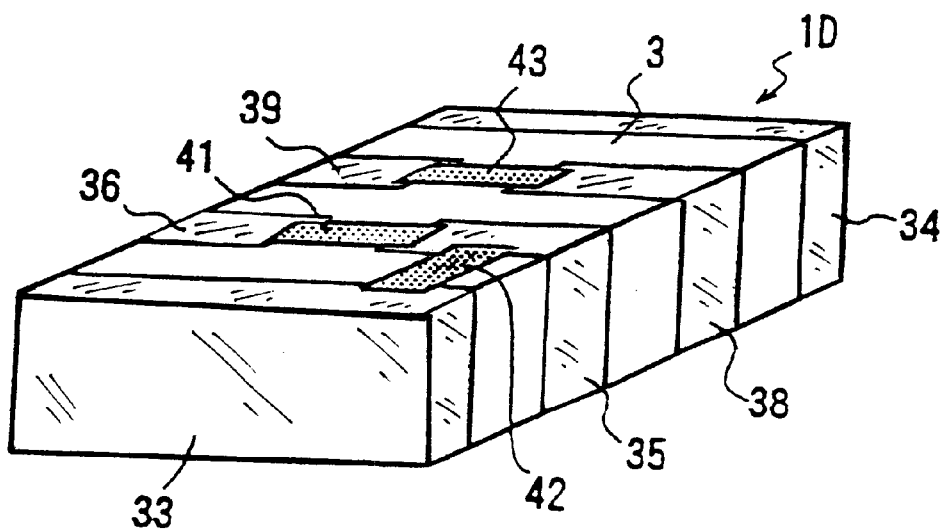
FIG. 8 is a perspective view of a fourth embodiment of the acceleration sensor.

FIG. 8 shows a fourth embodiment of an acceleration sensor 1D. In this embodiment, in addition to the external lead electrodes 33 and 34 for the sensing device 2, four external lead electrodes 35, 36, 38, and 39 are formed on a surface of the insulating case 3, in which a first resistor 41 is formed between the external lead electrodes 35 and 36, a second resistor 42 is formed between the external lead electrodes 35 and 33, and a third resistor 43 is formed between the external lead electrodes 38 and 39, by using a method such as printing so as to enhance the level of integration. At least one of the resistors 41, 42, and 43 can be used as a trimmable resistor. Since the other structure is the same as that in the first embodiment (shown in FIG. 1 and FIG. 2), the same reference numerals are given to the same parts and the explanation will be omitted.

Figure 9:
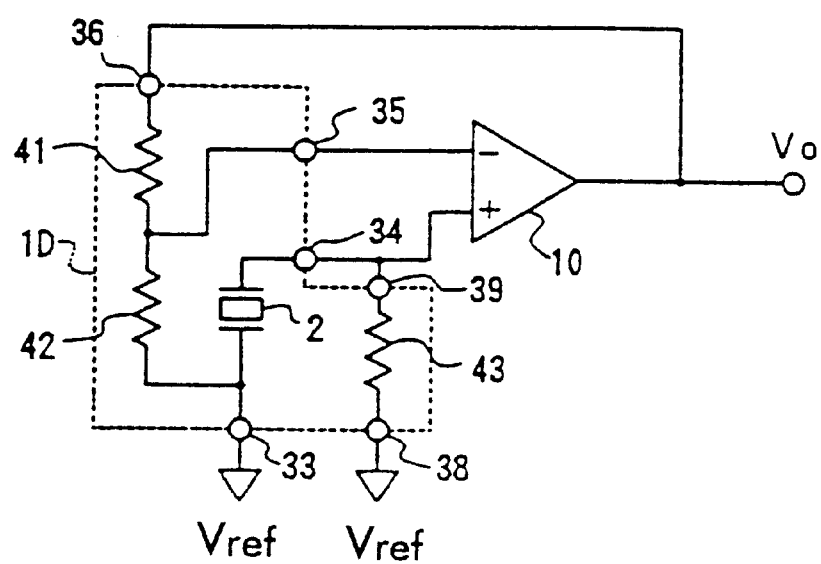
FIG. 9 is a circuit diagram of an example of an acceleration sensing device using the acceleration sensor shown in FIG. 8.

FIG. 9 shows an example of a circuit diagram of an acceleration sensing device using the acceleration sensor 1D shown in FIG. 8. Voltage $V_{ref}$ is applied to the external lead electrodes 33 and 38 of the acceleration sensor 1D; the external lead electrodes 34 and 39 are connected to the positive input of the operational amplifier 10; the external lead electrode 35 is connected to the inversion input of the operational amplifier 10; and the external lead electrode 36 is connected to the output of the operational amplifier 10. In this case, in addition to the sensitivity adjustment resistor 42, the feedback resistor 41 and the leak resistor 43 of the operational amplifier 10 are contained in the acceleration sensor 1D. Accordingly, these resistors can be used as trimmable resistors so as to freely perform sensitivity adjustment of the sensor 1D, and gain adjustment and leak adjustment of the operational amplifier 10.

The acceleration sensors 1A through 1D described in FIG. 1, FIG. 4, FIG. 6, and FIG. 8 are only some examples, and combinations of these embodiments or disposition of another device such as a capacitor on the insulating case 3 is possible. Additionally, the trimmable resistor is not limited to a film-formed resistor, and it may be a discrete component which is fixed by soldering or like.

The inner structure of the acceleration sensor is not restricted to the structure described in FIG. 2. For example, it is possible to use structures described in Japanese Unexamined Patent Application Publication No. 6-324073, Japanese Unexamined Patent Application Publication No. 7-20144, Japanese Unexamined Patent Application Publication No. 7-27784, Japanese Unexamined Patent Application Publication No. 8-75774, Japanese Unexamined Patent Application Publication No. 8-166401, Japanese Unexamined Patent Application Publication No. 9-61450, Japanese Unexamined Patent Application Publication No. 9-26433, and Japanese Unexamined Patent Application Publication No. 10-62445. Furthermore, a piezoelectric ceramic device may be disposed in a resin case.

As is clear from the description above, according to the present invention, since two external lead electrodes of an acceleration sensing device, a sensitivity adjustment trimmable resistor, and at least one of the external lead electrodes of the trimmable resistor are disposed on a surface of an insulating case in which the acceleration sensing device is disposed, a resistance value of the trimmable resistor may be adjusted by laser trimming or the like so as to adjust the sensitivity of the acceleration sensor alone and easily maintain sensitivity variations within a targeted tolerance. Furthermore, since the trimmable resistor is integrally disposed onto the acceleration sensor, the configuration of the sensor is not made larger, so that an acceleration sensor with substantially the same size as that of the present sensor, which can perform sensitivity adjustment, is obtainable.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An acceleration sensor comprising:
   an acceleration sensing device;
   an insulating case including the acceleration sensing device; and
   at least one sensitivity adjustment trimmable resistor provided on a surface of the insulating case and connected to the acceleration sensing device.

2. An acceleration sensor comprising:
   an acceleration sensing device;
   an insulating case including the acceleration sensing device; and
   at least one sensitivity adjustment trimmable resistor provided on a surface of the insulating case,
   wherein first and second external lead electrodes connected to the acceleration sensing device, and at least a third external lead electrode connected to one of two ends of the trimmable resistor, are provided on a surface of the insulating case.

3. The acceleration sensor according to claim 2, wherein the other end of the trimmable resistor is connected to one of the external lead electrodes of the acceleration sensing device.

4. The acceleration sensor according to one of claims 1–3, wherein the trimmable resistor is a film-formed resistor directly and integrally formed on the insulating case.

5. The acceleration sensor according to claim 2, wherein a second sensitivity adjustment trimmable resistor is disposed on the surface of the insulating case; the other end of the one trimmable resistor is connected to a fourth external lead electrode formed on the insulating case; and the second trimmable resistor has a first end connected to one of the first and second external lead electrodes of the acceleration sensing device and a second end connected to one of the third and fourth external lead electrodes.

6. The acceleration sensor according to claim 5, wherein a third trimmable resistor is disposed on the surface of the insulating case, the third trimmable resistor being connected to fifth and sixth external electrodes formed on the insulating case.

7. The acceleration sensor according to one of claims 1, 2 and 3 wherein:
   the acceleration sensing device is a bimorph-type sensing device in which a piezoelectric ceramic device converts an acceleration into electrical signals;
   the insulating case comprises a pair of insulating supporting frames for supporting both ends of the bimorph-type sensing device in a longitudinal direction thereof, and a pair of insulating cover plate for covering an opening surface defined by the bimorph-type sensing device and the supporting frames; and
   the trimmable resistor is formed on a surface of one of the cover plates.

8. The acceleration sensor according to any one of claims 5 and 6 wherein:
   the acceleration sensing device is a bimorph-type sensing device in which a piezoelectric ceramic device converts an acceleration into electrical signals;
   the insulating case comprises a pair of insulating supporting frames for supporting both ends of the bimorph-type sensing device in a longitudinal direction thereof, and a pair of insulating cover plate for covering an opening surface defined by the bimorph-type sensing device and the supporting frames; and
   each of the trimmable resistors is formed on a surface of one of the cover plates.

9. The acceleration sensor according to claim 8, wherein each of the trimmable resistors is a film-formed resistor directly and integrally formed on a surface of the insulating case.

10. Acceleration sensing apparatus, comprising:
    an amplifier;
    an acceleration sensing device;
    an insulating case including the acceleration sensing device; and
    at least one sensitivity adjustment trimmable resistor provided on a surface of the insulating case and connected to the acceleration sensing device and to the amplifier.

11. Acceleration sensing apparatus, comprising:
    an amplifier;
    an acceleration sensing device;
    an insulating case including the acceleration sensing device; and
    at least one sensitivity adjustment trimmable resistor provided on a surface of the insulating case, wherein first and second external lead electrodes connected to the acceleration sensing device, and at least a third external lead electrode connected to at least one of two ends of the trimmable resistor, are provided on a surface of the insulating case; and
    wherein one of the ends of the trimmable resistor is connected to the amplifier.

12. Acceleration sensing apparatus according to claim 11, wherein the other end of the trimmable resistor is connected to one of the external lead electrodes of the acceleration sensing device.

13. The acceleration sensor according to one of claims 10, 11 and 12, wherein the trimmable resistor is a film-formed resistor directly and integrally formed on the insulating case.

14. Acceleration sensing apparatus according to claim 11, wherein a second sensitivity adjustment trimmable resistor is disposed on the surface of the insulating case; the other end of the one trimmable resistor is connected to a fourth external lead electrode formed on the insulating case; and the second trimmable resistor has a first end connected to one of the first and second external lead electrodes of the acceleration sensing device and a second end connected to one of the third and fourth external lead electrodes and wherein the second trimmable resistor is connected to the amplifier.

15. Acceleration sensing apparatus according to claim 14, wherein a third trimmable resistor is disposed on the surface of the insulating case, the third trimmable resistor being connected to fifth and sixth external electrodes formed on the insulating case and also being connected to the amplifier.

16. Acceleration sensing apparatus according to one of claims 10, 11, and 12 wherein:
    the acceleration sensing device is a bimorph-type sensing device in which a piezoelectric ceramic device converts an acceleration into electrical signals;
    the insulating case comprises a pair of insulating supporting frames for supporting both ends of the bimorph-type sensing device in a longitudinal direction thereof, and a pair of insulating cover plate for covering an opening surface defined by the bimorph-type sensing device and the supporting frames; and
    the trimmable resistor is formed on a surface of one of the cover plates.

17. Acceleration sensing apparatus according to any one of claims 14 and 15 wherein:

the acceleration sensing device is a bimorph-type sensing device in which a piezoelectric ceramic device converts an acceleration into electrical signals;

the insulating case comprises a pair of insulating supporting frames for supporting both ends of the bimorph-type sensing device in a longitudinal direction thereof, and a pair of insulating cover plate for covering an opening surface defined by the bimorph-type sensing device and the supporting frames; and each of the trimmable resistors is formed on a surface of one of the cover plates.

18. Acceleration sensing apparatus according to claim 17, wherein each of the trimmable resistors is a film-formed resistor directly and integrally formed on a surface of the insulating case.

* * * * *